United States Patent

Richards et al.

[11] Patent Number: 6,098,399
[45] Date of Patent: Aug. 8, 2000

[54] DUCTED FAN GAS TURBINE ENGINE

[75] Inventors: Martyn Richards, Burton on Trent; John W Allen; Kenneth F Udall, both of Derby; David M Beaven, Nottingham, all of United Kingdom

[73] Assignee: Rolls-Royce plc, London, United Kingdom

[21] Appl. No.: 09/020,964

[22] Filed: Feb. 10, 1998

[30] Foreign Application Priority Data

Feb. 15, 1997 [GB] United Kingdom ............... 9703187

[51] Int. Cl.⁷ .......................... F02C 7/06; F02K 3/04
[52] U.S. Cl. .......................... 60/223; 60/226.1
[58] Field of Search .................. 60/39.091, 223, 60/226.1; 415/9

[56] References Cited

U.S. PATENT DOCUMENTS 4,201,513  5/1980  Sales ........................................... 415/9
5,433,584  7/1995  Amin et al. ................................ 415/9

FOREIGN PATENT DOCUMENTS 2281105  2/1995  United Kingdom ................... 415/9

Primary Examiner—Louis J. Casaregola
Attorney, Agent, or Firm—W. Warren Taltavull; Farkas & Manelli PLLC

[57] ABSTRACT

A ducted fan gas turbine has a fan shaft which is supported at its upstream end by a bearing. In the event of damage to the engine's fan, frangible bolts fracture to permit radial movement of the shaft. That movement is limited by the sequential engagement of the outer race of the bearing with first and second movement limiting portions on fixed structure of the engine. This alters the natural frequency of vibration of the fan, so permitting the fan to windmill without excessive vibration.

8 Claims, 4 Drawing Sheets

DUCTED FAN GAS TURBINE ENGINE

FIELD OF THE INVENTION

This invention relates to a ducted fan gas turbine engine and is particularly concerned with the preservation of the integrity of such an engine following damage to its fan.

BACKGROUND OF THE INVENTION

Ducted fan gas turbine engines conventionally comprise a core engine which drives a comparatively large diameter fan positioned at the upstream end of the core engine. The fan is made up of a plurality of aerofoil blades which can be vulnerable to damage as a result of foreign object ingestion by the engine. In most cases, the fan is sufficiently robust to withstand the effects of such foreign object ingestion without suffering major damage and is able to continue operating, although, perhaps at reduced efficiency.

On very rare occasions, the fan could be damaged to such an extent that parts of one or more of its aerofoil blades may be lost. This usually necessitates the shutting-down of the engine involved to minimise damage to the engine and to the aircraft carrying it. However, the imbalance in the fan created by the blade loss generates extremely high loads which must be at least partially absorbed before the engine is allowed to run-down to windmilling speed. Windmilling speed is the speed at which the engine rotates in a non-operative condition as a result of its motion through the atmosphere.

One way in which fan imbalance load absorption can be achieved is by the use of so-called "fuse bolts". Typically the main bearing supporting the upstream end of the shaft carrying the fan is supported radially from the remainder of the engine structure via a plurality of axially extending fuse bolts. In the event of major fan imbalance, the resultant high radial loads cause the fuse bolts to fracture in shear and allow the fan and its shaft to orbit about the engine's longitudinal axis. This continues as the engine is allowed to run down to windmilling speed. Such arrangements are disclosed in GB2079402 and GB2130340.

Unfortunately, under certain circumstances, the vibration resulting from fan imbalance that still exists at windmilling speed can still be extremely severe. This is due mainly to the natural frequency of the fan and the lack of radial stiffness of the fan assembly.

SUMMARY OF THE INVENTION

It is an object of the present invention to provide a ducted fan gas turbine engine in which the severity of such vibration is reduced.

According to the present invention, a ducted fan gas turbine engine having a longitudinal axis includes a shaft and fixed structure supporting that shaft, which shaft is normally coaxial with said engine longitudinal axis, a portion of said shaft being supported radially by a bearing structure which is in turn supported from said engine fixed structure by radially frangible connection means, first and second movement limiting means being provided on said engine fixed structure to limit radial movement of said shaft in the vicinity of said bearing following any fracture of said frangible support means to first and second radial distances from said engine longitudinal axis, said first radial distance being greater than said second radial distance, means being provided to facilitate said local radial movement limitation of said shaft initially by said first movement limiting means and subsequently by said second movement limiting means.

Preferably said bearing is so configured as to define an annular radially outward surface for sequential engagement with said first and second movement limiting means following any fracture of said frangible support means to limit radial movement of said shaft.

Said annular radially outward surface may be defined by the radially outer race of said bearing.

Said first and second movement limiting means are preferably in axial series relationship with each other.

At least part of said bearing is preferably axially translatable between said first and second movement limiting means following any fracture of said frangible support means.

Means may be provided to exert an axial load upon said at least part of said bearing to facilitate said axial translation thereof.

Said shaft may be the fan shaft of said engine.

BRIEF DESCRIPTION OF THE DRAWINGS

The present invention will now be described, by way of example, with reference to the accompanying drawings in which.

DETAILED DESCRIPTION

Figure 1:
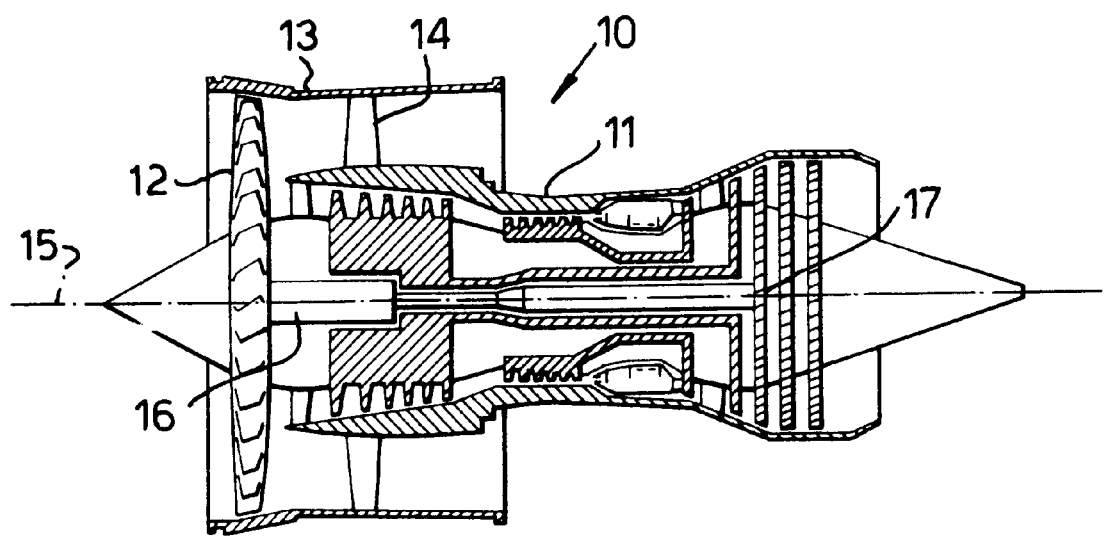
FIG. 1 is a schematic sectioned side view of a ducted fan gas turbine engine in accordance with the present invention.

With reference to FIG. 1, a ducted fan gas turbine engine generally indicated at 10 is of mainly conventional configuration. It comprises a core engine 11 which functions in the usual manner to drive a propulsive fan 12 positioned at the upstream end of the core engine 11 (the term "upstream" as used herein is with respect to the general direction of gas flow through the engine 10, that is, from left to right as viewed in FIG. 1). The propulsive fan 12 is positioned within a fan casing 13 which is supported from the core engine 11 by an annular array of outlet guide vanes 14. The ducted fan gas turbine engine 10 has a longitudinal axis 15 about which its major rotational parts rotate.

The fan 12 is mounted at the upstream end of a shaft 16 which is coaxial with the engine's longitudinal axis 15. The fan shaft 16 extends almost the full length of the gas turbine engine 10 to interconnect the fan 12 with the low pressure turbine 17 of the core engine 11. The fan shaft 16 is supported from the remainder of the core engine 11 by a number of roller bearings, one of which 18 which supports the upstream end of the fan shaft 16 and can be seen in detail in FIG. 2.

Figure 2:
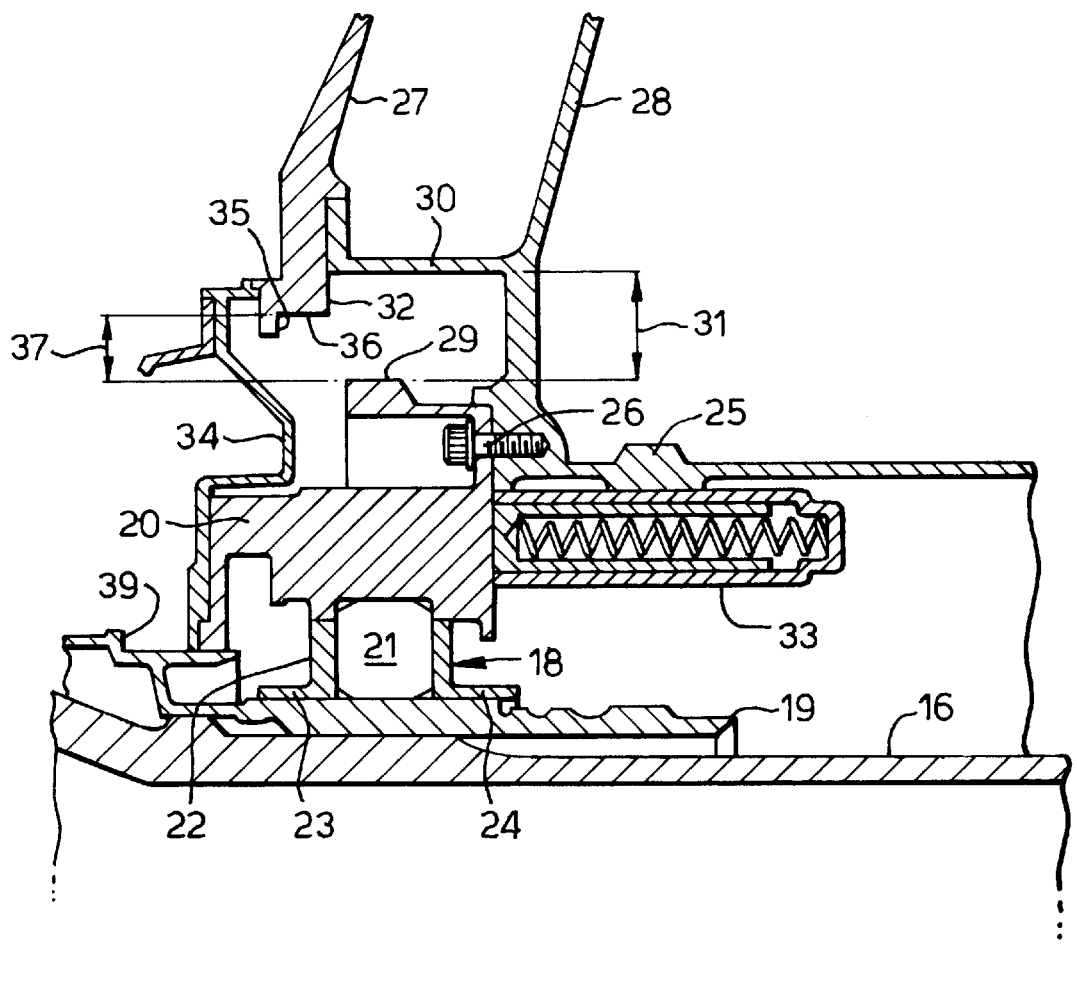
FIG. 2 is a sectioned view on an enlarged scale of the support structure for the bearing which supports part of the fan shaft of the engine shown in FIG. 1.

Referring to FIG. 2, the bearing 18 in question is positioned immediately downstream of the fan 12. It comprises a radially inner race 19 which locates upon the radially outer surface of the shaft 16, and a radially outer race 20.

A plurality of roller bearing elements 21 are interposed in an annular array between the inner and outer races 19 and 20 and are maintained in circumferentially spaced apart relationship by a cage 22. The cage 22 defines two annular, axially extending portions 23 and 24 which engage the radially inner race 19 in sliding relationship.

The radially outer race 20 is attached to the fixed structure 25 of the core engine 11 by an annular array of fuse bolts 26, one of which can be seen in FIG. 2. The core engine fixed structure 23 includes a pair of generally radially extending upstream and downstream panels 27 and 28 respectively which extend to the outer casing of the core engine 11 to provide radial support for the bearing 18.

In the event of fan 12 becoming unbalanced through major damage, large radial loads are imposed upon the fan shaft 16. This causes the fuse bolts 26 to fail in shear, thereby allowing the upstream end of the fan shaft 16 to depart from its coaxial relationship with the engine longitudinal axis 15 to move in a radially outward direction, destroying in turn a support member 34 which interconnects the panel 27 and the bearing inner race 20.

Figure 3:
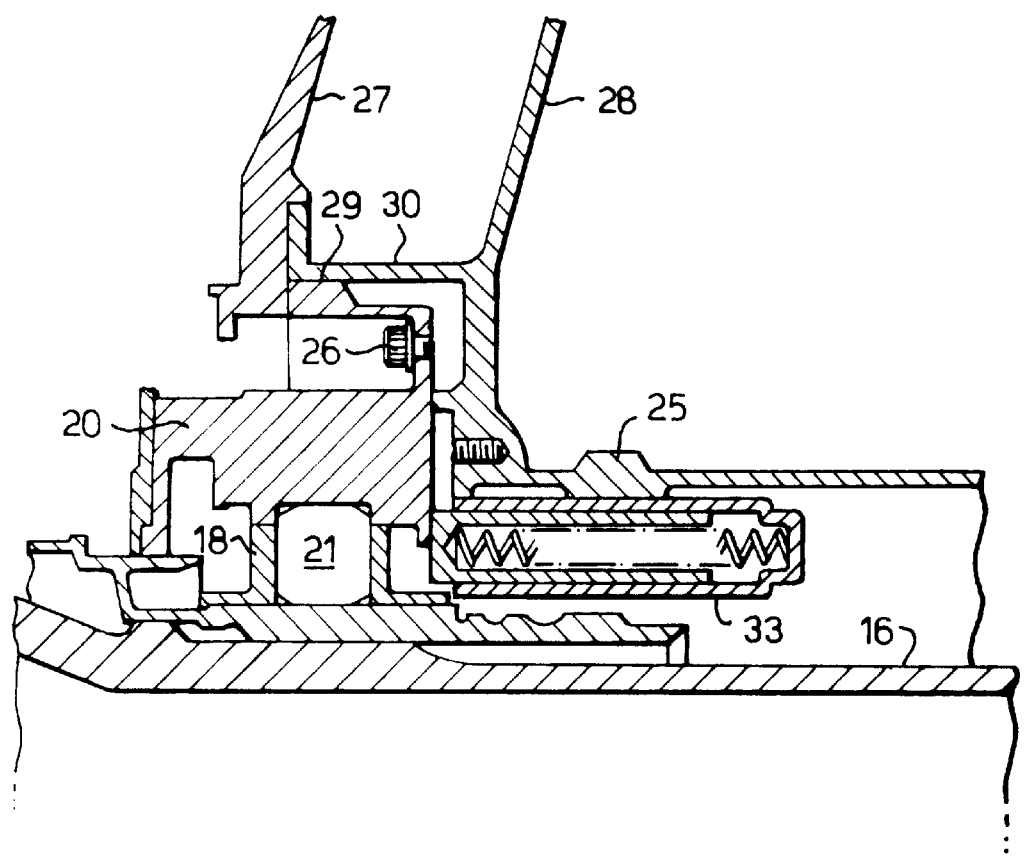
FIG. 3 is a view similar to that shown in FIG. 2 immediately following damage to the fan of the engine shown in FIG. 1.

The extent of radial movement of the fan shaft 16 is limited by the outer bearing race 20 engaging the core engine fixed structure 25. More specifically, an annular surface 29 defined by a radially outer portion of the outer race 20 engages in rolling contact an annular bridging piece 30 which interconnects the radially inner extents of the upstream and downstream panels 27 and 28. This can be seen if reference is now made to FIG. 3. The actual extent of radial movement by the upstream end of the fan shaft 16 is indicated by the arrow 31 in FIG. 2. Limiting radial movement of the fan shaft 16 in this manner ensures that major damage to the fan 12, and indeed the engine 10, is substantially avoided. The axis 38 of the fan shaft 16 is thus radially displaced from the engine longitudinal axis 15.

Following major damage to the fan 12, the normal practice is to allow the engine 10 to run down to windmilling speed. As this occurs, the radial displacement of the upstream end of the fan shaft 16 gradually reduces. In addition, there is a natural tendency for the bearing 18 to move in an upstream direction. In the initial stages of engine rundown, any upstream movement of the bearing 18 is prevented by the engagement of its outer race 20 with a first shoulder 32 defined by the radially inward region of the upstream panel 27.

As engine rundown proceeds, radial displacement of the shaft 16 reduces correspondingly and the radially outer race 20 of the bearing 18 is no longer axially constrained by the shoulder 32. This permits the radially outer race 20, the rolling elements 21 and the cage 22 to slide along the radially inner race 19 in the upstream direction. This is assisted by a plurality of compression spring-loaded pistons 33 which are attached to the core engine fixed structure 25 to exert a force in the upstream direction upon the radially outer race 20 of the bearing 18.

Figure 4:
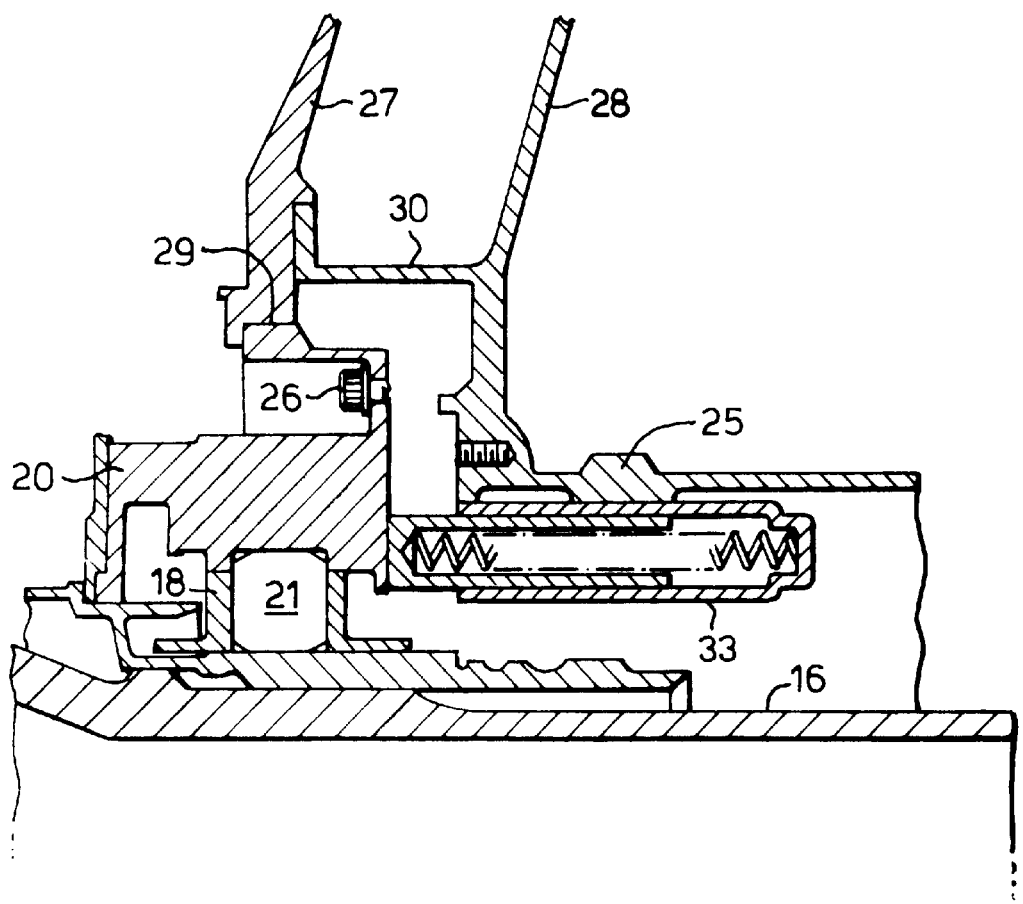
FIG. 4 is a view similar to that shown in FIG. 3 after the elapse of a period of time.

Upstream movement of the radially outer race 20 is, however, limited by its engagement with a second shoulder 35 which is also defined by the radially inward region of the upstream panel 27. Moreover, the extent of radial movement of the upstream end of the fan shaft 16 is further limited to a distance 37 by the engagement in rolling contact of the annular surface 29 of the bearing outer race 20 with a radially inwardly facing annular surface 36 defined by the radially inner extent of the upstream panel 27. This can be seen if reference is now made to FIG. 4. Additional limitation of the upstream movement of radially outer race 20 is provided by its engagement with an annular ridge 39 provided on an upstream part of the fixed structure of the engine 10.

When the engine 10 has finally run down to its windmilling speed, the outer bearing race 20 remains in rolling contact with the surface 36 on the panel 27. This effectively results in the upstream panel 27 providing partial radial support for the upstream end of the fan shaft 16. This is sufficient to alter the natural frequency of the fan 12 to such an extent that severe vibration from the fan 12 at windmilling speeds is substantially avoided. Typically, we have found that supporting the fan shaft 16 in this manner changes its natural frequency from about 8 Hz to about 40 Hz.

Under windmilling conditions when the outer race 20 of the bearing 18 rolls around the surface 36, wear is low on the various components involved since the fan shaft 16 is able to rotate about its new mass centre. Consequently, although the fan 12 has been damaged by a foreign object, damage to other parts of the engine 10 is minimised. The overall cost of engine repair is therefore correspondingly minimised.

Although the present invention has been described with reference to the fan shaft 16 of a ducted fan gas turbine engine, it will be appreciated that it need not be so limited. Thus the present invention may, in certain circumstances, be applicable to other shafts of a gas turbine engine.

What is claimed is:

1. A ducted fan gas turbine engine having a longitudinal axis and including a shaft and fixed structure supporting that shaft, which shaft is normally coaxial with said engine longitudinal axis, a bearing structure, a portion of said shaft being supported radially by said bearing structure and radially frangible connection means, said bearing structure being supported from said engine fixed structure by said radially frangible connection means, first and second movement limiting means being provided on said engine fixed structure to limit radial movement of said shaft in the vicinity of said bearing following any fracture of said frangible support means to first and second radial distances from said engine longitudinal axis, said first radial distance being greater than said second radial distance, means operating on said bearing structure being provided to facilitate said local radial movement limitation of said shaft initially relative to said first movement limiting means and subsequently relative to said second movement limiting means.

2. A ducted fan gas turbine engine as claimed in claim 1 wherein said bearing is so configured as to define an annular radially outward surface for sequential engagement with said first and second movement limiting means following any fracture of said frangible support means to limit radial movement of said shaft.

3. A ducted fan gas turbine engine as claimed in claim 2 wherein said annular radially outward surface is a portion of the radially outer race of said bearing.

4. A ducted fan gas turbine engine as claimed in claim 2 wherein said first and second movement limiting means are in axial series relationship with each other.

5. A ducted fan gas turbine engine as claimed in claim 4 wherein at least part of said bearing is axially translatable between said first and second movement limiting means following any fracture of said frangible support means.

6. A ducted fan gas turbine engine as claimed in claim 5 wherein means are provided to exert an axial load upon said at least part of said bearing to facilitate said axial translation thereof.

7. A ducted fan gas turbine engine as claimed in claim 6 wherein said means to exert an axial load upon said at least part of said bearing comprises a plurality of compression springs.

8. A ducted fan gas turbine engine as claimed in claim 1 wherein said shaft is the fan shaft of said engine.

* * * * *